United States Patent [19]
Bohnert et al.

[11] Patent Number: 5,269,440
[45] Date of Patent: Dec. 14, 1993

[54] VIBRATORY BOWL FEEDER WITH AUTOMATIC CLEAN OUT FUNCTION

[75] Inventors: Larry J. Bohnert, Monroe; William L. Dinkledine, Patosi, both of Wis.; Douglas C. Pax, Warren, Ill.

[73] Assignee: Honeywell Inc., Minneapolis, Minn.

[21] Appl. No.: 1,473

[22] Filed: Jan. 7, 1993

[51] Int. Cl.⁵ ............................................. B65G 47/00
[52] U.S. Cl. ................................. 221/200; 198/380; 198/757; 198/370; 221/278
[58] Field of Search .............. 190/380, 391, 757, 370; 221/200, 134, 278, 167, 171

[56] References Cited

U.S. PATENT DOCUMENTS

| | | | |
|---|---|---|---|
| 3,747,738 | 7/1973 | Greck | 221/167 |
| 4,721,228 | 1/1988 | Bejerano | |
| 4,732,258 | 3/1988 | Burgess | |
| 4,801,044 | 1/1989 | Kubota et al. | 221/200 |
| 4,852,771 | 8/1989 | Kanob | |
| 4,878,575 | 11/1989 | McDonald et al. | |
| 4,905,416 | 3/1990 | Harley | |
| 5,008,580 | 4/1991 | Masuda et al. | |
| 5,078,298 | 1/1992 | Omori | |
| 5,083,654 | 1/1992 | Nakajima et al. | 198/380 |
| 5,114,039 | 5/1992 | Walshe et al. | |

*Primary Examiner*—H. Grant Skaggs
*Attorney, Agent, or Firm*—William D. Lanyi

[57] ABSTRACT

A vibratory bowl feeder is provided with an automatic cleanout feature which comprises an opening formed in the bottom surface of a vibratory bowl proximate a ramp formed on that bottom surface. The ramp extends a predetermined angular distance around the bottom surface of the bowl and locally raises the surface that parts pass along as they move in response to the vibrations of the bowl. The raised surface of the ramp creates a step between the upper most surface of the ramp and the bottom surface of the bowl proximate the opening formed in the bottom surface of the bowl. A door is provided to selectively cover and uncover the opening. During normal operation, the door is closed and parts pass over the ramp, along the upper surface of the door and back to the bottom surface in response to the vibration of the bowl. When the door is moved to expose the opening in the bottom surface of the bowl, parts moving up the ramp surface fall down across a step between the ramp surface and the opening and through the opening to a container, or receiver, placed under the opening. In addition, a stream of air is selectively used to force components from the helical track of the bowl back toward the bottom surface to subsequently be removed through the opening as described above.

13 Claims, 5 Drawing Sheets

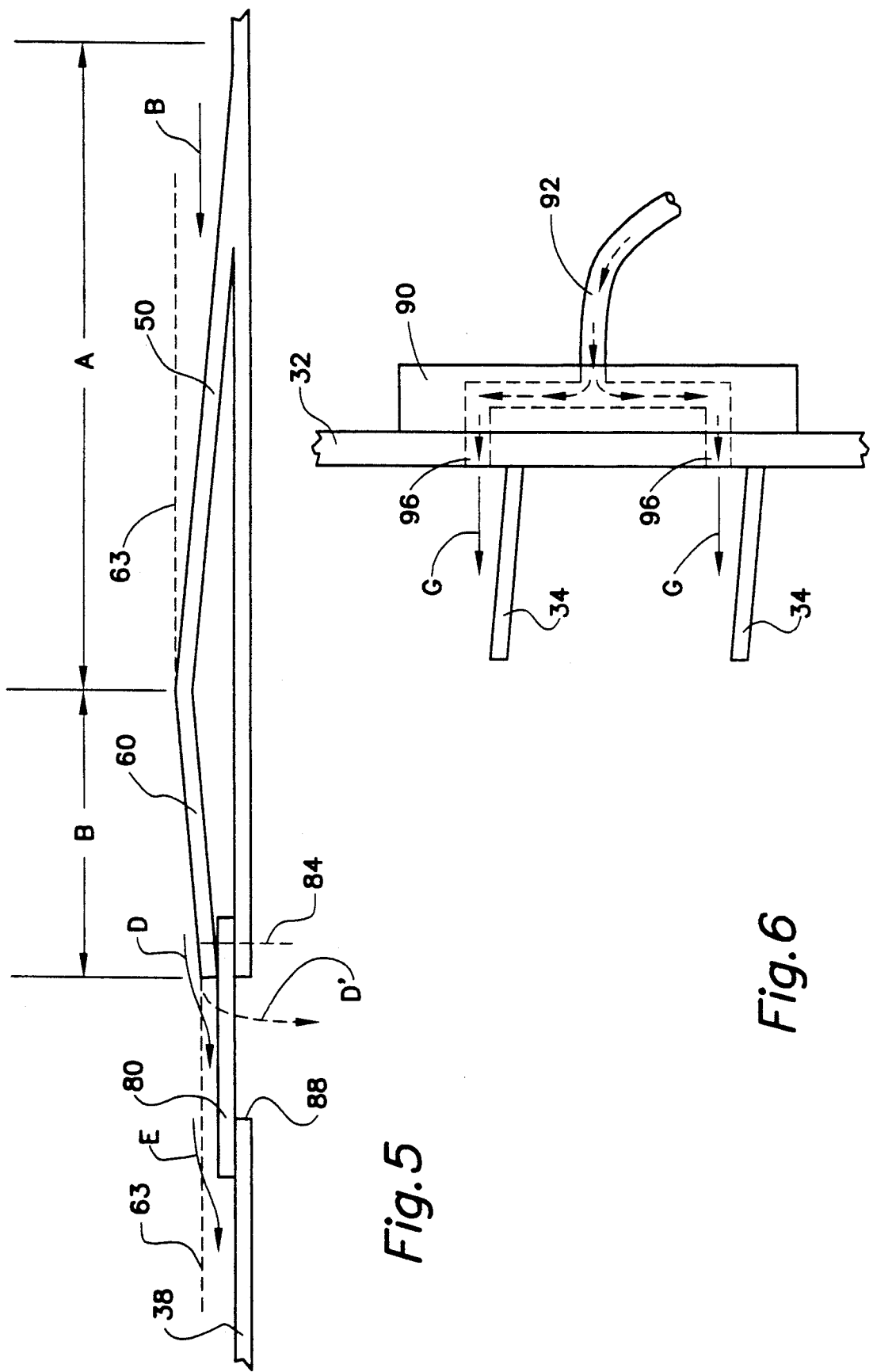

VIBRATORY BOWL FEEDER WITH AUTOMATIC CLEAN OUT FUNCTION

BACKGROUND OF THE INVENTION

1. Field of the Invention

The present invention relates generally to vibratory bowl feeders and, more specifically, to a vibratory bowl which is equipped with an automatic cleanout feature that empties the contents from the bowl with minimal operator interaction.

2. Description of the Prior Art

Vibratory bowl feeders have been known for many years in the fields of automatic assembly and manufacturing. Those skilled in the art of automatic assembly are also very much aware of the many different types of adaptations of vibratory bowls that have been provided to meet the needs of the many specific applications with which they are used. For example, U.S. Pat. No. 5,114,039, which issued to Walshe et al on May 19, 1992, describes an apparatus and method for discharging articles from a vibratory feeder. The apparatus is specifically used for transferring flanged articles from a vibratory feeder to a discharge station which features a pair of feed rails. One of the rails has a curved external surface for providing point bearing contact with a flange of the article being transferred.

U.S. Pat. No. 4,721,228, which issued to Bejerano on Jan. 26, 1988, discloses an apparatus for dispensing elongated small mechanical parts. It comprises a component handling assembly and a buffer assembly. The component handling assembly receives bulk quantities of the components and, when activated, properly orients each component and supplies the components in a randomly timed sequence to the buffer assembly. The buffer assembly comprises a cylindrical upper receiving housing having a plurality of cylindrical chambers radially disposed in a circular pattern and rotatable about a central generally vertical axis.

U.S. Pat. No. 4,852,771, which issued to Kando on Aug. 1, 1989, describes a parts supply hopper that is operatively associated with a parts feeder for supplying the latter with a predetermined amount of articles. It includes a generally cup-shaped container held in an angular position and rotatable at least through an angle of 180 degrees and a partition wall disposed with the container so as to define therebetween upper and lower chambers disposed on opposite sides of the partition wall.

U.S. Pat. No. 4,878,575, which issued to McDonald et al on Nov. 7, 1989, discloses a vibratory feeder for elastomeric components. The apparatus is provided with a means for accepting an initially presented population of randomly oriented articles formed from a soft elastomeric material. It provides a high speed output stream wherein all of said articles are commonly oriented for further mechanical manipulation. The apparatus includes an input bowl for accepting the articles. The bowl includes a rotatable central disc for feeding objects incident thereupon to the periphery of the disc.

U.S. Pat. No. 4,905,416, which issued to Harley on Mar. 6, 1990, describes a reversing weight assembly for a vibratory bowl finishing machine. It includes a dampening housing attached to the upper end of a drive shaft for the machine. The housing is filled with dampening material such as a viscous fluid and includes a freely rotatable damping vane inside the housing. The vane is connectable to an upper eccentric weight which is rotatable in correspondence with rotation of the dampening vane.

U.S. Pat. No. 4,732,258, which issued to Burgess, Jr. on Mar. 11, 1988, describes a vibratory work station module and system. The module includes a buffer storage area for transitory storage of work piece carriers which are received at non-specific intervals and an escapement station to facilitate performance of some operation of a work piece carried by each carrier. The buffer storage area includes a conveying surface which is defined by a multiplicity of fibers and which is vibrated to move the carriers longitudinally therealong. The resiliency of the fibers permits carriers which are adjacent the escapement station to remain stationary even though the conveying surface is vibrating.

U.S. Pat. No. 5,008,580, which issued to Masuda et al on Apr. 16, 1991, discloses a piezoelectric vibration generator and vibratory parts feeder. The generator interconnecting a base and the vibratory conveyor table of a piezoelectrically driven vibratory parts feeder includes a pair of resilient plate members joined together at their lower ends and disposed in a configuration substantially folded about the joint therebetween. The vibration generator of the folded configuration has a relatively small length and hence is capable of reducing the overall height of the vibratory parts feeder.

U.S. Pat. No. 5,078,298, which issued to Omori on Jan. 7, 1992, describes a parts feeding apparatus for use in feeding a supply of garment appliance parts such as buttons, hooks, slide fastener component parts and the like from parts reservoirs or parts feeders through a plurality of feed chutes onto a parts applying holder. The feed chutes each carry thereon an array of parts of different types and colors. The feed chutes are pivotally moveable in the same plane into and out of an operative position relative to the parts applying holder in which position the parts are selectively transferred onto the holder.

In many applications of vibratory feeders, the feeder bowl is filled with parts, or components, that are required in an automatic assembly process. Often, the machinery used to assemble the components can be quickly changed over to assemble other components of alternative design. When this changeover occurs, it is typically necessary for the vibratory bowl feeder to be completely emptied of its existing parts so that parts of a different style or size can be deposited into the bowl feeder in anticipation of the automatic assembly of a new style of component. This is particularly common in the automatic manufacture of components such as switches. When a preselected number of switches is manufactured on an automatic assembly line, the line must be quickly changed over to permit it to begin manufacturing a new style of switch. When this occurs, the plurality of feeder bowls associated with the automatic assembly line must each be emptied and refilled with the appropriate style of component that is suitable for the switch that is to be manufactured.

As is well known to those skilled in the art, the emptying of bowl feeders can be difficult and can require significant time. Some techniques that have been employed in the past include the use of vacuum hoses to remove small components from the bowl, escapement doors formed in the sides of the bowl to permit the bowl to automatically move the parts to the escapement door and permit the parts to drop out through the wall of the bowl or, alternatively, the removal of the parts from the bowl by hand. All of these techniques are disadvantageous in one way or another. The use of a vacuum device to empty a vibratory bowl can damage small and delicate components. The use of the escapement door in the side of a vibratory bowl is extremely slow and can not be depended upon to completely empty the bowl. For example, some parts will continually be caused to fall back into the center of the bowl because of their improper positioning or configuration which does not allow them to move all of the way around the track of the bowl to reach the escapement door. As is well understood by those skilled in the art of vibratory bowl feeders, any mating edges of components within the bowl can cause small parts to snag between the mating edges and other bowl surfaces. During normal operation of a vibratory bowl feeder, these snagged parts can seriously impede the proper operation of the bowl. Therefore, when escapement doors are used in the sides of bowls, significant care must be taken to make sure that the edges of the door meet the edges of the bowl opening and track with significant accuracy to avoid snagging components in the crack therebetween.

The hand removal of parts from a vibratory feeder bowl is also disadvantageous in that it is slow, it can bend and damage delicate components within the bowl and it can contaminate the parts with the natural oils that normally exist on human hands. It would therefore be significantly beneficial to the field of automatic vibratory bowl feeders if a means is developed to rapidly empty the bowl without damaging the parts or contaminating them. It would also be advantages if the bowl cleanout means is automatic and able to remove the contents of the bowl in an expeditious manner with minimum required involvement by the operator.

SUMMARY OF THE INVENTION

The present invention provides a vibratory bowl feeder with an improved cleanout feature. In a preferred embodiment, the present invention comprises a vibratory bowl having a generally cylindrical wall portion and a helical track attached to an inner surface of the wall portion. A bottom surface of the bowl is provided with a ramp portion extending a preselected angular distance around a centerline of the bowl. The upper end portion of the ramp is disposed above the bottom surface of the bowl to define a step therebetween and an opening is formed in the bottom surface proximate the step. A cover is movably associated with the bowl and is alternately moveable between a first position over the opening and a second position retracted away from the opening. Throughout the description of the present invention, the cover which is moveable to a position over the opening will also be referred to as a door. However, this terminology does not imply that the cover, or door, must be attached to the bowl with either a hinge or a pivot point. Alternative embodiments of the present invention could possibly include a door which is completely removable from contact with the bowl or which slides linearly into a position away from the opening but still in contact with the bowl. In its broadest sense, the cover, or door, used in the preferred embodiment of the present invention is any component that is capable of covering the opening during normal use of the bowl and revealing the opening during the bowl cleanout procedure. In a particularly preferred embodiment of the present invention, the cover is disposed partially below the ramp and partially above the bottom surface when in its first position.

One embodiment of the present invention further comprises a means for directing a gas stream across an upper surface of the helical track in a direction toward the centerline of the bowl so that components can be blown off the track and onto the bottom surface of the bowl for subsequent automatic removal through the opening of the present invention. The cover is rotatably moveable about a pivot attached to the bottom portion of the bowl in a preferred embodiment of the present invention and the ramp portion comprises an upper portion having a decreased slope, relative to the lower portion of the ramp, at a region where the components traversing the bottom portion of the bowl are expected to exit from the ramp portion onto the bottom portion across the step. Although in a preferred embodiment of the present invention the upper portion of the ramp is sloped downward toward the location immediately above the opening, it should be understood that this downward slope of the upper portion of the ramp is not a requirement of the present invention and could alternatively be a generally horizontal upper portion or an upper portion that continues the upward slope of the other portions of the ramp. As will be described in greater detail below, the downward slope of the upper portion of the ramp is used to increase the speed of movement of parts traveling along the bottom surface of the bowl immediately prior to their falling off the ramp to the door. Although this increase in speed improves the operation of the bowl feeder, it is not an absolute necessity for all embodiments of the present invention.

BRIEF DESCRIPTION OF THE DRAWINGS

The present invention will be more fully and completely understood from a reading of the Description of the Preferred Embodiment in conjunction with the drawings, in which:

FIG. 5 is a folded out view of a portion of the present invention in order to show the progress of components along the relevant upper surfaces of various portions of the present invention;

FIG. 6 shows the air manifold used in conjunction with one preferred embodiment of the present invention;

DESCRIPTION OF THE PREFERRED EMBODIMENT

Figure 1:
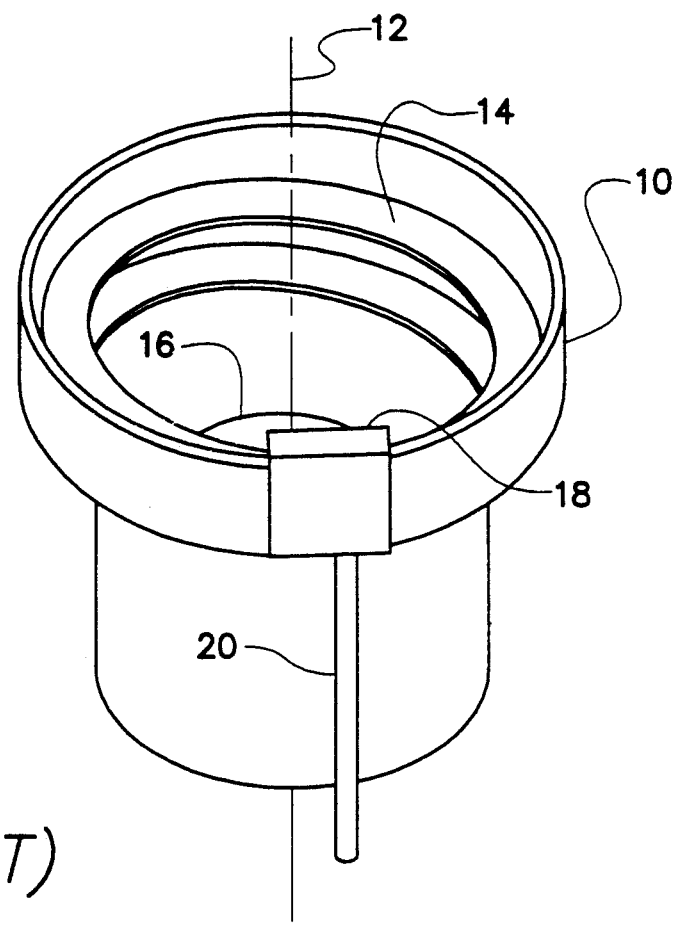
FIG. 1 shows a perspective view of one type of bowl feeder known in the prior.

Throughout the Description of the Preferred Embodiment of the present invention, like components will be identified by like reference numerals.

Figure 2:
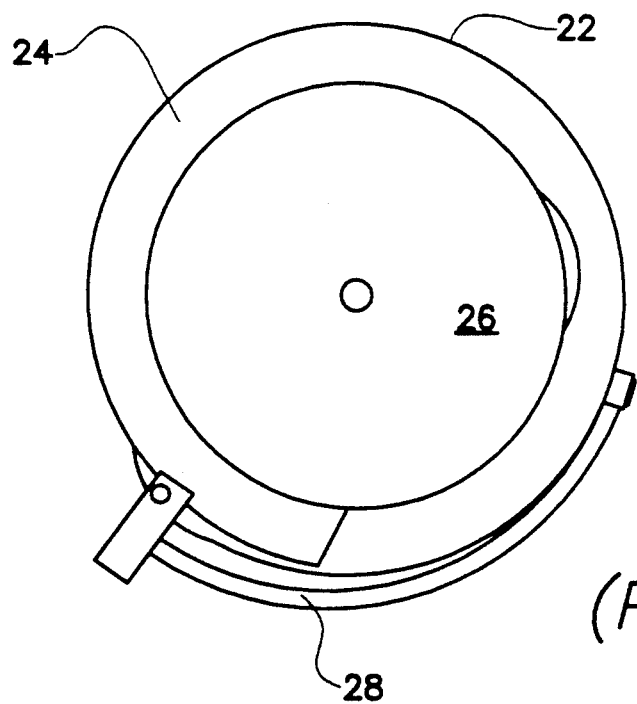
FIG. 2 shows a top view of another type of bowl feeder known in the prior art.

FIGS. 1 and 2 illustrate the basic components of vibratory feeder bowls that are well known to those skilled in the art. FIG. 1 illustrates a typical feeder bowl such as that described in U.S. Pat. No. 4,721,228 which has been discussed above. A vibratory feeder bowl of the type shown in FIG. 1 comprises a generally cylindrical wall structure 10 coaxially disposed about a generally vertical centerline 12. The wall structure can be of a uniform diameter along its entire height or, as shown in FIG. 1, can comprise regions of two different diameters. It should also be understood that some vibratory bowl feeders comprise wall portions that taper with a gradually increasing diameter toward the upper end of the bowl. In other words, the wall porion of the bowl is generally similar in shape to the frustum of a cone.

With continuing reference to FIG. 1, the bowl also comprises a helical track 14 that extends around the inner surface of the wall portion 10 from the bottom surface 16 of the bowl to an upper location at which the track 14 is generally attached to some appropriate means for conveying components away from the bowl toward an operative position where the component is either acted upon or assembled into another device. In the particular vibratory bowl shown in FIG. 1 and described in U.S. Pat. No. 4,721,228, the bowl is provided with a selector gate 18 into which the parts move from the track 14. The selector gate 18 then passes the components toward the chute 20 by which they are directed toward an operative position. The primary purpose of FIG. 1 is to show that the typical vibratory bowl comprises a wall portion 10 that is generally cylindrical and a helical track 14 that extends from a bottom surface 16 of the bowl toward a position at the upper end of the wall portion 10.

FIG. 2 shows a vibratory bowl that is known to those skilled in the art and described in U.S. Pat. No. 5,114,039 which has been discussed above. The top view in FIG. 2 illustrates the generally cylindrical shape of the outer wall 22, the shape of the helical track 24 viewed from above and the bottom surface 26 located at the bottom of the bowl. Although FIG. 2 also shows a pathway 28 connected to the bowl, that component is easily changeable for other adaptations of the bowl and is not particularly relevant to this discussion.

Throughout the description of the preferred embodiment of the present invention, the helical track attached to the side of the bowl is illustrated and described as a helical track which results in parts moving upward along the inner wall of the bowl as the parts move in a counterclockwise direction viewed from above the bowl. However, it should clearly be understood that alternatively configured bowl feeders could operate in the opposite direction, whereby parts placed in the bowl move upward along the inner wall of the bowl, along a helical track, as they move in a clockwise direction viewed from above the bowl. The clockwise or counterclockwise direction of the path along which the parts move within the bowl is not related directly to the concepts of the present invention. Instead, the present invention can be employed in vibratory bowl feeds which operate in a clockwise or a counterclockwise direction. For purposes of the discussion below, the present invention will be described as being implemented in association with a vibratory bowl feeder that moves parts within the bowl in a counterclockwise direction as the parts move upward on a helical track along the inner wall of the bowl.

Figure 3:
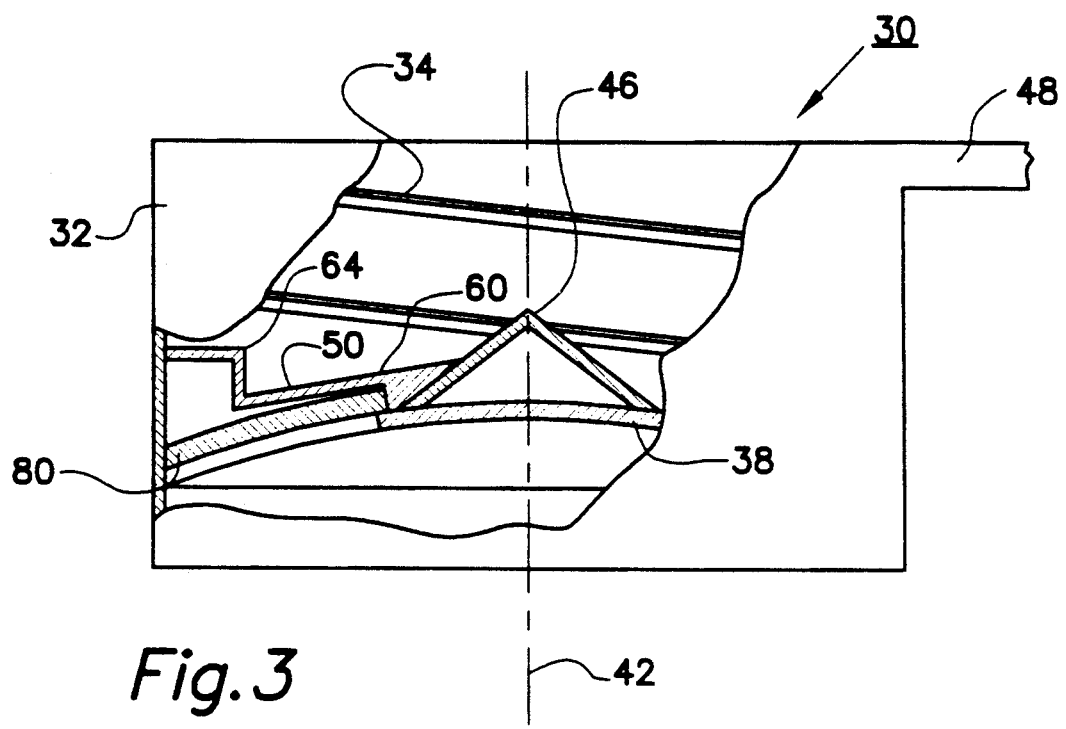
FIG. 3 is a sectioned side view of one embodiment of the present invention.

FIG. 3 shows a sectioned side view of a vibratory bowl 30 made in accordance with the concepts of the present invention. The bowl 30 is provided with a generally cylindrical wall portion 32 and a helical track 34 attached to the inner cylindrical surface of the wall portion 32. The bottom surface 38 of the bowl in the embodiment shown in FIG. 3 is generally convex and is bowed so that the natural tendency of parts located on the bottom surface 38 will be to migrate toward the wall portion 32 and away from the centerline 42. To further induce this migration away from the centerline 42, a conical component 46 is located in the central region of the bottom surface 38. The purpose for the convex shape of the bottom surface 38 and the conical component 46 is to urge components located on the bottom surface 38 to migrate toward the wall so that they can more readily enter the helical track 34 and then progressively move along the helical path toward operating locations where the components can be appropriately positioned so that they can be acted upon by other equipment. An exit portion 48 of track 34 is schematically illustrated in section at the right portion of FIG. 3 to illustrate that the components moving along the helical track 34 would eventually exit from the bowl and be received by other equipment. However, it should be clearly understood that the particular structure of the exit portion 48 is not significant to the operation of the present invention.

Figure 4:
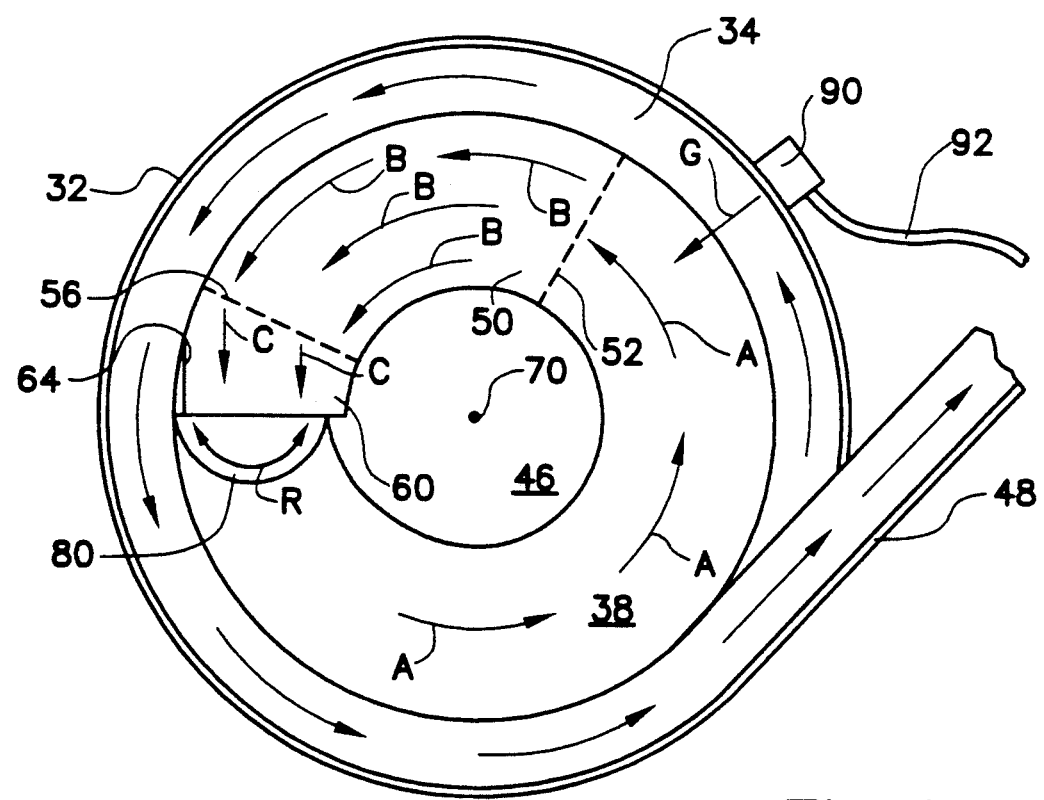
FIG. 4 is a top view of the bowl shown in FIG. 3.

FIG. 4 shows a top view of the bowl shown in FIG. 3. The wall portion 32 is generally cylindrical and provides a support for the helical track 34 along its inner cylindrical surface. The bottom of the bowl shown in FIG. 4 comprises the bottom surface 38 and the conical portion 46 as described above. The exit portion 48 of track 34 shows a path that components can follow after they pass along the entire length of the helical track 34. In a typical application, the exit portion 48 would be connected to automatic assembly equipment that would combine the parts exiting the bowl with other parts from other bowls.

With reference to both FIGS. 3 and 4, it can be seen that the bottom surface 38 has an inclined portion or ramp 50. It should be understood that the bottom surface 38 is generally symmetrical about centerline 42 with the exception of the ramp 50 which is inclined to rise upwardly from the bottom surface 38 beginning at the point identified by dashed line 52. From dashed line 52, the ramp portion 50 rises from the bottom surface 38 and gradually increases the height of components traveling along its surface. This ramp 50 continues from dashed line 52 to dashed line 56, with the height of the components traveling along the ramp being continually increased as they pass between those dashed lines.

During normal operation, parts deposited on the bottom surface 38 of the bowl will proceed in a counterclockwise direction, as indicated by arrows A, in response to the controlled vibration of the bowl. As the parts move past the region identified by dashed line 52, they begin to move up the ramp 50 along the paths identified by arrows B. In a particularly preferred embodiment of the present invention, the ramp 50 extends between the regions identified by dashed lines 52 and 56 and the portion identified by reference numeral 60 is not similarly inclined or sloped. In other words, reference numeral 60 identifies a portion of the ramp structure which comprises a generally level or downwardly inclined surface. The reasons for this change in slope of the ramp structure will be described in greater detail below.

As the parts move from the ramp 50 onto portion 60, they pass along paths identified by arrows C. In one particular embodiment of the present invention, a wall structure 64 is provided to divert the movement of the components away from the inner surface of the wall structure 32 and toward the center 70 of the bowl feeder. The purpose of this wall structure 64 is to move the components away from sections of the present invention, between the outer wall and door 80, that may otherwise create an obstruction or induce binding of the components within the bowl. The ramp portion 50 raises the height of the components above the bottom surface 38 s that when they exit from the portion identified by reference numeral 60, they are at a height which is above that of the bottom surface 38. Therefore, as they pass toward the end of portion 60 the components will drop down from the edge of the overall ramp structure. During normal operation, these components will drop down onto the door 80 and then will continue to pass in a counterclockwise direction and eventually drop from the surface of door 80 onto the bottom surface 38. As is well known by those skilled in the art, the continual counterclockwise movement of parts in a vibratory bowl is intended to permit the parts to eventually migrate toward the bottom portion of the helical track 34 and eventually move upwardly along the helical track. This normal operation would also occur in a bowl adapted to include the present invention. In other words, the parts would continue to move in a counterclockwise direction along arrows A, B and C and the parts, or components, which do not enter the track 34 during any particular excursion around the bowl will continue to move in a counterclockwise direction until they eventually enter the track 34.

With reference to FIGS. 3 and 4, it can be seen that the ramp 50 and portion 60 are above the upper surface of the door 80 which, in turn, is above the upper surface of the bottom surface 38 because of the overlapping association of these components. Therefore, as the parts leave the portion 60 and fall onto the door 80 they are moving downward and without obstruction to their path. This lack of obstruction is also provided in the region where the parts leave the upper surface of door 80 and fall downward to the bottom surface 38.

FIG. 5 is intended to more explicitly describe the travel of a component along the ramp 50, the portion identified by reference numeral 60, the door 80 and the bottom surface 38. The illustration shown in FIG. 5 is a rolled out view of the illustrations shown in FIGS. 3 and 4. The view is rolled out for the purpose of simplifying the discussion. As a component moves along the ramp 50, as indicated by arrow B, it continually raises its height above the bottom surface 38 as it passes along the length of dimension A in FIG. 5. When the component reaches the end of ramp 50 it enters the region identified by reference numeral 60. Along the length of dimension B in FIG. 5, between the region identified by reference numeral 56 in FIG. 4 and the edge of portion 60, it ceases to rise relative to the bottom surface 38. To illustrate this change in slope, dashed line 63 extends parallel to the portion 60. The angle between dashed line 63 and ramp 50 represents the change in slope between the ramp 50 and portion 60. Although not an absolute necessity of the present invention, it has been empirically determined that an advantage can be achieved if portion 60 is level or downwardly sloped toward the door 80. If, on the other hand, portion 60 is upwardly sloped in a manner similar to the ramp 50, the components moving along the ramp could tend to hesitate as they reached the edge of portion 60 and could therefore hesitate before dropping downwardly onto door 80. If this hesitation occurs, parts can jam and congregate in the region at the edge of portion 60 prior to falling downwardly onto door 80. Not only can jamming occur, but the slow dropping of a component from region 60 to door 80 can also cause the component to tumble and occasionally fall onto the door 80 in a position that exacerbates the jamming problem. If portion 60 is made level or, preferably, downwardly sloping, the components increase their speed between the portion identified by dashed line 56 and the edge of portion 60. The increased speed of the components passing along portion 60 provides two beneficial advantages. The increased speed tends to separate the components as they pass along the surface of portion 60 and, in addition, the increased speed assists the components in leaving the surface of portion 60 and falling onto door 80 in a manner which also discourages jamming.

The components exit the portion 60 as indicated by arrow D and fall downwardly onto the upper surface of door 80. After passing over door 80, the components again fall downwardly as indicated by arrow E onto the bottom surface 38 of the bowl. The relative positions of portion 60, door 80 and bottom surface 38 provide a "shingle effect", or overlapping association, that is advantageous in vibratory bowl arrangements. The shingle effect discourages jamming of components and avoids parts hanging up at locations where the edges of surfaces abut.

With continued reference to FIG. 5, it can be seen that door 80 is rotatably attached to the bottom of the bowl for pivoting about centerline 84 which is located in the region of portion 60. In one particular embodiment of the present invention, a pivot is provided under portion 60 to allow the door 80 to pivot relative to centerline 84 and thereby expose the opening identified by reference numeral 88 in FIG. 5. The movement of door 80 is illustrated by arrow R in FIG. 4. If door 80 is pivoted about line 84 to expose opening 88, the movement of the components travelling along the surface of portion 60 would pass along the path indicated by dashed arrow D' instead of along that represented by solid arrow D. In other words, the components would fall through opening 88 and could be collected by a receiver, such as a container, disposed under opening 88.

With reference to FIGS. 3, 4 and 5, it can be seen that when door 80 is opened to expose opening 88, parts passing over portion 60, as indicated by arrows C, will drop downwardly through opening 88 and can then be collected in a container for removal. On the other hand, when door 80 is closed by pivoting it about centerline 84, components will continue to move over door 80 and not fall through opening 88. This continued movement in a counterclockwise direction around the centerline 42 of the vibratory bowl feeder permits the components to eventually migrate onto the helical track 34 and continue their path toward normal assembly by external equipment.

When a decision is made to empty a vibratory bowl feeder, many hundreds of parts may have already entered the helical track 34. All of these parts will have to be removed from the bowl in order to thoroughly clean it and permit parts of a different style to be disposed in the bowl. In order to hasten the evacuation of the bowl, the parts on the helical track must also be quickly removed. To assist in this process, a gas stream is used in a preferred embodiment of the present invention. With reference to FIG. 4, a manifold 90 is connected to an air supply hose 92. Openings in the manifold 90 are provided in fluid communication with openings in the wall structure 32 of the bowl feeder. Arrow G in FIG. 4 indicates the air stream provided through the wall 32 by the manifold 90. This air stream is intended to force components from the track toward the center of the bowl and downwardly onto the bottom surface 38 for subsequent removal by the present invention as described above. Because of the air stream G provided by manifold 90, the parts migrating along the helical track are quickly cleared from the track and the overall bowl cleaning operation is expedited.

FIG. 6 illustrates a more detailed view of a typical manifold 90 used for these purposes. As shown in FIG. 6, manifold 90 is attached to the wall portion 32 of the bowl. Conduits formed within manifold 90 direct an air stream from a hose 92 to openings 96 formed in the wall 32. These openings 96 are advantageously disposed to direct an air stream G across the upper surface of the helical track 34. As can be seen, the openings 96 are disposed relative to two regions of helical track 34 in order to expedite the emptying of the track by blowing the components off of track 34 downwardly onto the bottom surface 38 of the bowl feeder. In some alternative embodiments of the present invention, the inwardmost edge of the helical track 34 can be downwardly sloped to facilitate the removal of parts from the track by the air stream. However, the downward sloping inner edges of the helical track are not required in all embodiments of the present invention. Although two openings 96 are shown in FIG. 6, it should be clearly understood that the number of openings in the wall 32 is not a limiting factor of the present invention. Instead, the number of openings 96 are determined as a result of the required speed of cleanout operation and the length and rate of rise of the helical track 34. In the simplified illustration of FIG. 6, the manifold 90 is shown attached to wall 32 with no valve disposed in the lines extending to openings 96. In addition, no valve is shown in line 92. Even though no valves are illustrated in FIG. 6, it should be understood that, for convenience, a valve would typically be placed in gas line 92 or, alternatively, in both gas lines leading to openings 96. These valves are not illustrated in FIG. 6 for purposes of simplicity.

Figure 7:
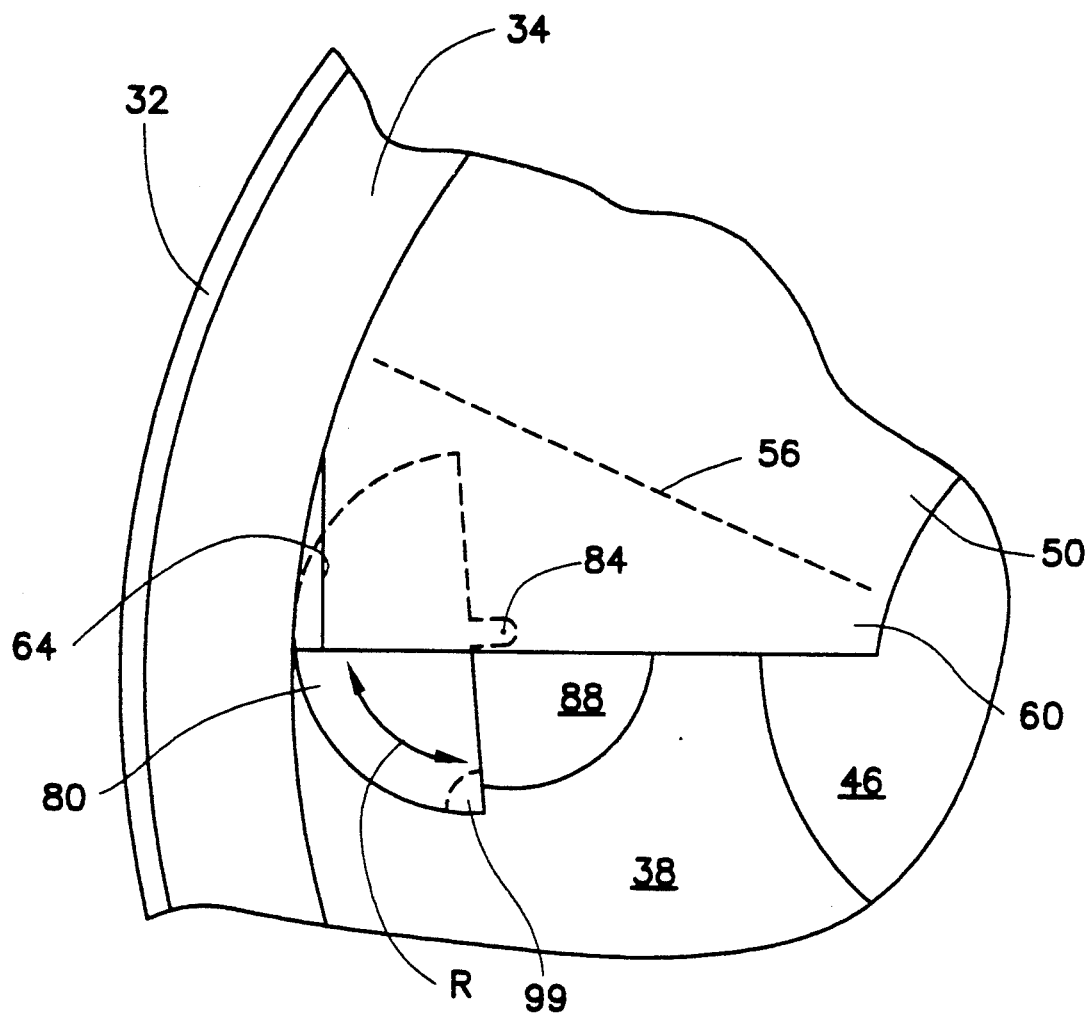
FIG. 7 is an enlarged view of one portion of the present invention incorporating its door, opening and ramp portion.

FIG. 7 is an enlarged view of a portion of FIG. 4. The purpose of FIG. 7 is to more clearly illustrate the operation of the door 80 and its relative movement with regard to the other components in FIG. 7. The door 80 is partially shown by phantom line in order to more completely illustrate its relative location under portion 60 of the ramp structure. As shown in FIG. 7, the door 80 can completely cover opening 88 if it is rotated in a counterclockwise direction about its central axis 84. On the other hand, if door 80 is rotated in a clockwise direction about centerline 84, it can expose opening 88 and permit parts to drop from portion 60 downward through opening 88 to a container (not shown in the Figures) disposed directly under opening 88 for later removal of the parts from the bowl feeder.

With continued reference to FIG. 7, it can be seen that the effective outer diameter of door 80 exceeds the effective diameter of opening 88 so that the Opening is completely covered when the door is rotated counterclockwise about centerline 84. This larger diameter of door 80 also provides the shingle effect described above in conjunction with FIG. 5. Also shown in FIG. 7 is the diversion wall 64 that, in a most particularly preferred embodiment of the present invention, moves components away from the wall 32 as they pass into proximity with the door 80. This prevents any inadvertent jamming of components at the regions where the door edges are proximate other components where jamming might otherwise occur.

It should be understood from the above description of the bowl cleanout operation that the entire process can be completed without touching the components with human hands or external equipment, such as vacuum hoses. Since the operation of the present invention continues to move the parts within the bowl in the same direction that the parts moved during normal operation, the present invention does not empty the parts from the portion of the device identified by reference numeral 48. The parts in the exit portion 48 must be removed by some other means. In addition, parts that are within the vibratory bowl between the location of the manifold 90 and the initial parts of the exit portion 48 will move into the exit portion through normal operation of the present invention. Those parts or components will have to be removed from the exit portion by hand unless it is acceptable for those parts or components to continue along the exit portion 48 toward other automated equipment. It should also be understood that, although not explicitly shown in FIG. 7, the upper region of the door 80 can be provided with a latch (in the area identified by reference numeral 99) which is operatively configured to cooperate with an undersurface of portion 60 to hold the door 80 in its closed position. This type of snap attachment can include the provision of a lip surface on door 80 that attaches to a corresponding configuration under portion 60. Alternatively, the relative position of door 80 with respect to portion 60 can be configured to provide an interference fit between the door and the under side of portion 60 when the door 80 is closed. This type of interference fit will also hold the door in its closed position during normal operation.

In operation, the cleanout feature of the present invention would be implemented by placing a container, or receiver, under opening 88, rotating door 80 about centerline 84 in a clockwise direction and turning on a air supply through hose 92. The normal operation of the vibratory bowl feeder would cause the parts within the bowl to move in a counterclockwise direction around the bottom surface 38 and around the helical track 34. As the parts move along the bottom surface 38, they will eventually move upwardly along ramp 50 and portion 60 and then move downwardly through opening 88 into an appropriately placed container. The air passing through hose 92 will create air streams G that will force components off the helical track 34 and downwardly onto bottom surface 38. In a relatively short period of time, all of the components within the bowl through opening 88 and into the container placed under the bowl. Other than the cleanout of exit portion 48, as described above, the evacuation procedure requires no contact with human hands or other external equipment, such as vacuum hoses and brushes, that could otherwise damage or contaminate the components within the bowl.

Figure 8:
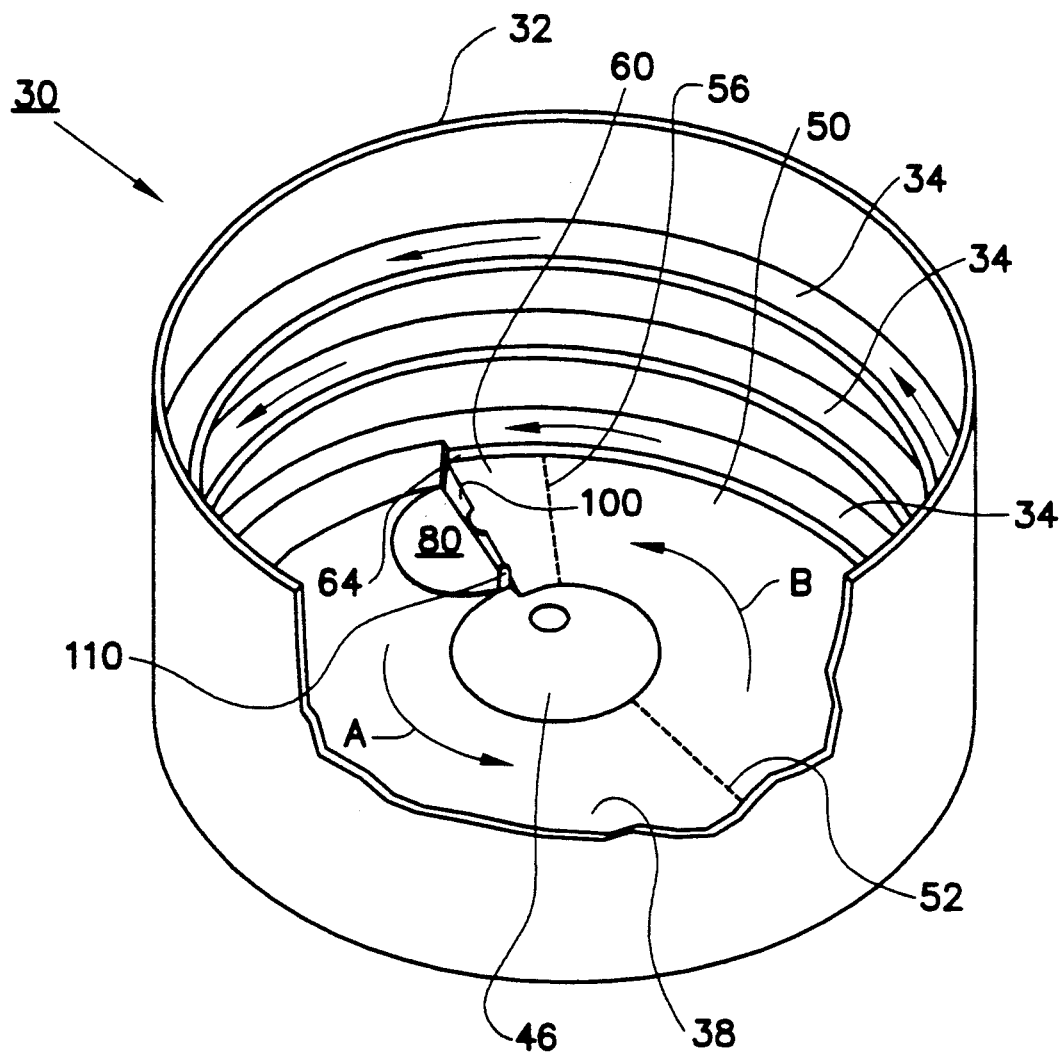
FIG. 8 shows a perspective view of the present invention incorporated into a vibratory bowl feeder.

FIG. 8 shows a vibratory bowl 30 with a helical track 34 attached to the wall portion 32. As described above, the helical track 34 begins at the bottom surface 38 and continues upward along a helical path as shown. The bottom surface 38 is convex in order to urge components disposed within the bowl toward the outer edges of the bottom surface and onto the helical track 34. A ramp 50 is shown rising from the bottom surface 38, beginning at dashed line 52, to provide an incline that extends a predetermined arcuate distance around the centerline of the bowl. For example, in FIG. 8 the incline extends from dashed line 52 to dashed line 56. As parts move in a counterclockwise direction around the bottom surface 38 of the bowl, they eventually enter the region of dashed line 52 and begin to progress up the ramp 50. The portion of the surface identified by reference numeral 60 is of a different slope than the portion of the ramp between the dashed lines for the reasons described above. The conical component 46 is shown in the central region of the bowl and is included for the reasons described above. At the end of the ramp and, more specifically, the region identified by reference numeral 60, a step 100 causes the vibrating components to fall downward onto the door 80 and then eventually back onto the bottom surface 38 when the door 80 is closed and the bowl 30 is operated normally. When a cleanout of the bowl is required, door 80 can be rotated about its centerline 84 to expose the opening 88 located below the door. This permits the components moving counterclockwise around the bottom surface 38 to drop through the opening and into a container provided below the bowl.

As can be seen in FIG. 8, the door 80 can be provided with a small extension 110 to facilitate its being opened manually. The wall portion 32 has been partially torn away in FIG. 8 for the purpose of illustrating the present invention in association with the bowl 30. In addition, the manifold 90 is not shown in FIG. 8 but, as described above, would be attached to the wall portion 32 in association with openings 96 through the wall portion to permit air to be introduced to force components off the helical track 34 and down onto the bottom surface 38 so that they can progress in a counterclockwise direction and eventually drop through the opening 88 which is exposed when door 80 is rotated about its centerline in a clockwise direction.

Although the present invention has been described in specific detail and illustrated to show a particularly preferred embodiment of the present invention, it should be understood that alternative embodiments are also within its scope. For example, although door 80 is generally semicircular in shape and rotatably associated with the bottom portion of the bowl, it could alternatively be formed in other shapes and move linearly instead of rotatably. In addition, the provision of an air stream G to blow components off the helical track 34 is not a requirement in every embodiment of the present invention. In addition, portion 60 of the ramp 50 need not be included in all embodiments of the present invention. Although portion 60 has been described as being beneficial to the operation of the present invention, certain applications of these concepts could operate in a perfectly satisfactory manner without the inclusion of the level or downwardly sloped portion 60. The provision of a conical member 46 in the central portion of the bowl is advantageous because it urges the components toward the outer periphery of the bottom surface 38 of the bowl. However, the inclusion of the conical member is not a requirement in all embodiments of the present invention.

The embodiments of the invention in which an exclusive property or right is claimed are defined as follows:

1. A vibratory bowl, comprising:
   a wall portion;
   a track attached to an inner surface of said wall portion;
   a bottom surface having a ramp, extending a preselected angular distance around a centerline of said bowl, an end portion of said ramp being disposed above said bottom surface to define a step therebetween;
   an opening formed in said bottom surface proximate said step; and
   a cover movably associated with said bowl, said cover being alternately moveable into a first position over said opening and into a second position retracted away from said opening, said cover being below said ramp and above said bottom surface when in said first position.

2. The bowl of claim 1, further comprising:
   means for directing a gas stream across an upper surface of said track in a direction toward said centerline of said bowl.

3. The bowl of claim 1, wherein:
   said cover is rotatably moveable about a pivot attached to a bottom portion of said bowl.

4. The bowl of claim 1, wherein:
   said ramp comprises a portion having a decreased slope relative to an upwardly sloped lower portion of said ramp.

5. The bowl of claim 1, wherein:
   said bottom surface is generally convex.

6. The bowl of claim 1, wherein:
   said bottom surface comprises a conical portion at its central portion, said conical portion having a steeper slope than the remaining portion of said bottom surface surrounding said conical portion.

7. A vibratory bowl, comprising:
   a generally cylindrical wall portion;
   a helical track attached to an inner surface of said wall portion;
   a bottom surface having a ramp portion extending a preselected angular distance around a centerline of said bowl, an end of said ramp portion being disposed above said bottom surface to define a step therebetween;
   an opening formed in said bottom surface proximate said step;
   a cover rotatably associated with said bowl, said cover being alternately moveable into a first position over said opening and into a second position retracted away from said opening, said cover being said ramp and above said bottom surface when in said first position; and
   means for directing a gas stream across an upper surface of said helical track in a direction toward said centerline of said bowl.

8. The bowl of claim 7, wherein:
   said ramp portion comprises a first region having a decreased slope relative to a second region of said ramp portion.

9. The bowl of claim 8, wherein:
   said bottom surface is generally convex.

10. The bowl of claim 9, wherein:
    said bottom surface comprises a conical portion at its central portion, said conical portion having a steeper slope than the remaining portion of said bottom surface surrounding said conical portion.

11. A feeder bowl, comprising:
    a wall portion;
    a helical track attached to said wall portion;
    a bottom surface;
    a ramp extending a preselected angular distance around a centerline of said bottom surface, said ramp having a first portion and a second portion, said first portion being upwardly inclined from said bottom portion;

an opening formed in said bottom surface proximate said second portion of said ramp;

a door disposed in moveable association with said bowl between a first position over said opening and a second position retracted away from said opening; and means for causing components disposed on said track to fall down onto said bottom surface.

12. The bowl of claim 11, wherein:
said causing means comprises a gas manifold.

13. The bowl of claim 11, wherein:
said second portion of said ramp is downwardly sloped from said first portion toward said bottom surface.

* * * * *